United States Patent [19]
Mahmoud et al.

[11] Patent Number: 6,051,268
[45] Date of Patent: Apr. 18, 2000

[54] METHODS FOR TREATING MILK PRODUCTS

[75] Inventors: Reyad Mahmoud, Cortland; John D. Miller, Ithaca, both of N.Y.

[73] Assignee: Pall Corporation, East Hills, N.Y.

[21] Appl. No.: 09/100,034

[22] Filed: Jun. 19, 1998

Related U.S. Application Data

[62] Division of application No. 08/683,093, Jul. 15, 1996, abandoned.

[51] Int. Cl.$^7$ .............................. A23C 1/187; A23J 1/02; A23J 1/00
[52] U.S. Cl. ...................... 426/580; 426/330.2; 426/657; 426/656; 210/641
[58] Field of Search ................................. 426/580, 330.2, 426/657, 656; 210/641

[56] References Cited

U.S. PATENT DOCUMENTS

| | | |
|---|---|---|
| 3,743,480 | 7/1973 | Falk . |
| 3,813,289 | 5/1974 | Huber et al. . |
| 4,125,527 | 11/1978 | Buhler et al. ........................... 530/414 |
| 4,140,806 | 2/1979 | Glimenius et al. . |
| 4,340,591 | 7/1982 | Lucotte et al. . |
| 4,352,695 | 10/1982 | Tomka . |
| 4,407,747 | 10/1983 | Lippe et al. . |
| 4,462,932 | 7/1984 | Lonergan . |
| 4,644,056 | 2/1987 | Kothe et al. . |
| 4,721,674 | 1/1988 | Lepienne et al. . |
| 4,876,100 | 10/1989 | Holm et al. . |
| 4,897,465 | 1/1990 | Cordle et al. . |
| 4,906,616 | 3/1990 | Gilchrist et al. . |
| 5,008,376 | 4/1991 | Bottomley . |
| 5,075,424 | 12/1991 | Tanimoto et al. . |
| 5,143,630 | 9/1992 | Rolchigo . |
| 5,149,647 | 9/1992 | Burling . |
| 5,254,250 | 10/1993 | Rolchigo et al. . |
| 5,256,437 | 10/1993 | Degen et al. . |
| 5,310,877 | 5/1994 | Spencer . |
| 5,356,651 | 10/1994 | Degen et al. . |
| 5,401,523 | 3/1995 | Degen et al. . |
| 5,468,844 | 11/1995 | Smith . |
| 5,578,213 | 11/1996 | Miller et al. . |

FOREIGN PATENT DOCUMENTS

| | | |
|---|---|---|
| 216567 | 10/1988 | New Zealand . |
| 226344 | 8/1991 | New Zealand . |
| 238751 | 3/1994 | New Zealand . |
| 240725 | 5/1994 | New Zealand . |
| 248417 | 7/1994 | New Zealand . |
| 245929 | 12/1994 | New Zealand . |
| 591203 | 1/1978 | U.S.S.R. . |
| WO 92/21425 | 12/1992 | WIPO . |
| WO 94/13148 | 6/1994 | WIPO . |

OTHER PUBLICATIONS

Maubois, J. L., et al,; "Industrial Fractionation of Main Whey Proteins", Dairy Research Laboratory, pp. 1–23.
Damerow et al, "Die Anwendung Der . . . Konsummilch", DMZ Deutsche Molkerei Zeitung, vol. 110, No. 50, Dec. 1989, pp. 1602–1608.
Piot et al, "Microfiltration en flux tangentiel des lactoserums de fromagerie", Le Lait, vol. 64, pp. 102–120.
Chemical Engineering, 86 (16), 73–76 (1979).
Perry's Chemical Engineers' Handbook ($6^{th}$ ed., McGraw–Hill Book Co., N.Y.), pp. 17–51 through 17–54 (1984).
Harris et al., *Protein Purification Methods: A Practical Approach*, (Oxford University Press, N.Y.), pp. 80–87 (1989).
Kinsella, "Proteins from Whey: Factors Affecting Functional Behavior and Uses," *New Dairy Products via New Technology*, Chapter 6, IDF Seminar—Atlanta (Oct. 1985).
Damerow et al., Die Anwendung Der Mikrofiltration für Konsummilch, Molke, *DMZ Deutsche Molkerei Zeitung*, vol. 110 (50), pp. 1602–1603, 1606–1608 (Dec. 1989).
Daufin et al., Ultrafiltration of Defatted Whey: Influence of Some Physicochemical Characteristics, *Australian Journal of Dairy Technology*, vol. 47 (1), pp. 7–13 (May 1992).
Piot et al., Microfiltration en flux tangentiel des lactosérums de fromagerie, *Le Lait*, vol. 64, pp. 102–120 (1984).
Merin et al., 1983, New Zealand Journal of Dairy Science & Tech., vol. 18, pp. 153–160.

*Primary Examiner*—Mary E. Mosher
*Assistant Examiner*—Ali R. Salimi
*Attorney, Agent, or Firm*—Leydig, Voit & Mayer, Ltd.

[57] ABSTRACT

The present invention provides methods for treating milk products to reduce the bacteria and fat therein and/or to recover proteins therefrom. In particular, the present invention provides a method of treating a milk product comprising dynamically filtering the milk product (particularly skim milk or whey) through a filtration medium having a pore rating of about 0.1–1 μm to produce a fat-depleted milk product permeate. The present invention also provides a method of concentrating a protein in a milk product comprising dynamically filtering the milk product through a filtration medium to form a protein-enriched retentate or a protein-enriched permeate. This method can be repeated with the protein-enriched fraction using filtration media of increasingly smaller pore ratings in order to recover particular proteins or combinations of proteins (from among many proteins in the milk product).

15 Claims, No Drawings

METHODS FOR TREATING MILK PRODUCTS

This disclosure is a divisional of patent application Ser. No. 08/683,093, filed Jul. 15, 1996, now abandoned.

TECHNICAL FIELD OF THE INVENTION

The present invention relates to methods of treating milk products, such as milk and whey, particularly to remove fat and recover proteins therefrom.

BACKGROUND OF THE INVENTION

Milk contains, among other things, fats, proteins (casein and a variety of other proteins such as β-lactoglobulin, α-lactalbumin, serum albumin, and immunoglobulins), salts, sugar (lactose), and various vitamins (such as vitamins A, C, and D, along with some B vitamins) and minerals (primarily calcium and phosphorus). The composition of milk varies with the species, breed, feed, and condition of the animal from which the milk is obtained. Commercially produced milk commonly undergoes pasteurization to mitigate bacterial growth and homogenization to improve fat dispersion stability. Whey is the watery part of milk that separates from the curds, as in the process of making cheese. As such, whey contains all of the milk components except for calcium caseinate and most of the milk fat.

In the commercial processing of milk products (such as skim milk and whey), it is desirable in certain instances to remove as much fat as possible from the milk products. In addition, since many of the components of milk products have separate commercial value independent of the milk products as a whole, it is desirable to be able to recover such components (particularly proteins) from the milk products. For example, a wide variety of whey proteins are used as functional and nutritional ingredients in bakery products, pasta, confections, beverages, meats, and the like.

Conventional milk processing heretofore has involved the use of mechanical separation (centrifugation), evaporation/cystallization, steam injection, electrodialysis, reverse osmosis, ultrafiltration, gel filtration, diafiltration, and/or ion exchange chromatography. For example, whey typically is subjected to mechanical separation (e.g., centrifuged) to remove fat, condensed via evaporation to increase solids content, and then spray dried or used for lactose crystallization. After desludging, the residual concentrate is dried, which yields whey powder containing about 11–14% protein (which usually is denatured, particularly during the evaporation/condensation step). The whey powder can be subjected to electrodialysis to remove ash and thereby prepare demineralized whey powder. Alternatively, the whey powder can be subjected to reverse osmosis to remove water, thereby obtaining whey powder containing about 12–15% protein. Such a whey powder can be subjected to ultrafiltration or gel filtration to remove further ash and lactose and thereby obtain a whey protein concentrate containing about 30–50% protein, which, in turn, can be subjected to diafiltration or ion exchange chromatography to remove yet more ash and lactose so as to obtain whey protein concentrates containing about 50–90% protein.

Such conventional processing involves many disadvantages, including long processing times, high costs, and poor or inconsistent component fractionations. Thus, there is a need for improved methods of treating milk products, particularly to more efficiently remove fat and to allow for the more efficient recovery of protein fractions therefrom. The present invention provides such treatment methods for milk products (particularly whey products). These and other advantages of the present invention, as well as additional inventive features, will be apparent from the description of the invention provided herein.

BRIEF SUMMARY OF THE INVENTION

The present invention provides methods for treating milk products to reduce the bacteria and fat therein and/or to recover proteins therefrom. In particular, the present invention provides a method of treating a milk product comprising dynamically filtering the milk product (particularly skim milk or whey) through a filtration medium having a pore rating of about 0.05–1 μm to produce a bacteria- and fat-depleted milk product permeate. The present invention also provides a method of concentrating a protein in a milk product comprising dynamically filtering the milk product through a filtration medium to form a protein-enriched retentate or a protein-enriched permeate. This method can be repeated with the protein-enriched fraction using filtration media of increasingly smaller pore ratings in order to recover particular proteins or combinations of proteins (from among many proteins in the milk product).

DESCRIPTION OF THE PREFERRED EMBODIMENTS

The present invention provides methods of treating milk products, particularly skim milk and whey products, to reduce bacteria and fat therein and/or recover proteins therefrom. The present invention is applicable to any type of milk product, especially skim milk and whey products. Skim milk is prepared by removing the cream from whole milk, and skim milk products include such raw skim milk as well as fractions therefrom (e.g., milk or milk products which have been previously subjected to filtration or other separatory processes, including but not limited to whey and whey products). Whey typically is produced in cheese making, although the present invention is intended to encompass the use of other types of whey. Whey products include whey as well as fractions therefrom. As such, whey products include, for example, cheese whey, clarified whey, whey powder, pasteurized whey, whey concentrates, and other whey fractions (e.g., whey or whey products which have been previously subjected to filtration or other separatory processes).

The present invention accordingly provides a method of treating a milk product (particularly a skim milk or whey product, and most particularly raw skim milk or cheese whey) comprising dynamically filtering the milk product through a filtration medium having a suitable pore rating to produce a bacteria-depleted and fat-depleted milk product permeate. The filtration medium desirably has a pore rating of about 1 μm or less, e.g., about 0.05–1 μm.

It may be desirable, but not necessary, to effect the agglomeration of the fat within the milk product (i.e., increase the effective size of the fat globules within the milk product) prior to dynamically filtering the milk product. Such fat agglomeration can be achieved in any suitable manner, including by chemical means (such as by adding to the milk product an agglomeration agent) or by physical means (such as by passing the milk product through a coalescer). For example, an agglomerating agent, e.g., calcium chloride or calcium phosphate, can be introduced into the milk product, which is then raised to an elevated temperature for a short period of time (e.g., about 50° C. for about 5–10 minutes, or a higher temperature for a shorter period of time).

When a milk product containing casein (e.g., raw skim milk, as opposed to, for example, whey which does not contain significant amounts of casein) is being dynamically filtered in the context of the present invention, such an agglomeration technique can lead to the removal of significant amounts of casein along with the fat globules (which may or may not be desirable, depending upon the desired end product).

In order to remove bacteria and fat from raw skim milk (while leaving significant amounts of casein and other proteins intact), the filtration medium preferably has a pore rating of about 0.2–1 μm (e.g., 0.25–0.9 μm), more preferably about 0.3–0.8 μm, and most preferably about 0.4–0.7 μm (particularly about 0.4–0.65 μm), in the absence of the use of agglomeration techniques. If the raw skim milk is subjected to agglomeration techniques prior to being dynamically filtered, then the filtration medium can have a larger pore rating to minimize the rejection of desirable proteins, such as casein, while maximizing fat depletion. Such a filtration medium preferably has a pore rating of about 0.4–1 μm, more preferably about 0.6–0.8 μm.

In order to remove bacteria and fat from whey (while leaving significant amounts of proteins intact), the filtration medium preferably has a pore rating of about 0.02–0.2 μm, more preferably about 0.04–0.1 μm, in the absence of the use of agglomeration techniques. If the whey product is subjected to agglomeration techniques prior to being dynamically filtered, then the filtration medium can have a larger pore rating to minimize the rejection of desirable proteins while maximizing fat depletion. Such a filtration medium preferably has a pore rating of about 0.7 μm or less (e.g., about 0.1–0.7 μm), more preferably about 0.1–0.6 μm, and most preferably about 0.1–0.4 μm (particularly, about 0.1–0.2 μm Alternatively, raw skim milk and whey can be homogenized prior to being dynamically filtered. Such homogenization does not enhance the removal of bacteria, fat, casein, or other proteins; however, homogenization can allow for longer filtration times before the fouling of the filtration medium necessitates the cleaning or replacement of the filtration medium.

While the milk product need not contain proteins, it typically will contain proteins, and, in that respect, it is preferred that the filtration medium allow the proteins to pass therethrough when the filtration medium is used to produce a bacteria-depleted and fat-depleted milk product permeate. Generally, it will be desirable to allow substantially all, if not all, proteins in the milk product to pass through the filtration medium. Since the largest protein in milk, e.g., raw skim milk, is casein which generally will pass through a filtration medium having a pore rating of about 0.4 μm or more, the use of a filtration medium having a pore rating of about 0.4 μm or more (e.g., 0.5 μm or more), but less than about 1 μm, in the context of the present invention generally will enable the removal of a significant portion of the fat from the milk product (which will be in the fat-enriched retentate), while leaving a significant portion, preferably substantially all, of the proteins in the milk product (which will be in the fat-depleted permeate). By comparison, since most proteins contained in whey products have a molecular weight of about 1,000,000 Dalton or less, the use of a filtration medium of about 0.1 μm or more in the context of the present invention generally will enable the removal of a significant portion of the fat from the whey product (which will be in the fat-enriched retentate), while leaving a significant portion, preferably substantially all, of the proteins in the whey product (which will be in the fat-depleted permeate). Of course, if the largest proteins in the milk product (including whey products) are of smaller molecular weight, then a filtration medium with a smaller pore rating can be used to remove a larger portion of the fat from the milk product while minimizing the possibility of removing proteins, albeit with an increased pressure drop across the filtration medium and the risk of premature clogging necessitating the regeneration or replacement of the filtration medium.

The dynamic filtration utilized in the context of the present invention can be any suitable dynamic filtration. Dynamic filtration is based upon the operating principle of maintaining a filter medium free from plugging or fouling by repelling particulate matter from the filtration medium and by disrupting the formation of fouling layers adjacent to the filtration medium. These results are accomplished by moving the fluid being filtered fast enough relative to the filtration medium to produce high shear rates as well as high lift forces on the particles, such as by use of rotary, oscillating, reciprocating, or vibratory means. The shear at the fluid-filtration medium interface is nearly independent of any crossflow fluid velocity, unlike tangential or crossflow filtration techniques (which suffer from other problems such as premature filtration medium plugging due to compound adsorption and large and nonuniform pressure drops associated with high tangential velocities along the filtration medium length, potentially causing backflow through the filtration medium and reducing flux).

Dynamic filtration offers a number of performance advantages in the context of the present invention. Very high shear rates can be produced in the dynamic filtration assembly so as to provide enhanced lift to repel small particles and/or to allow high permeate flow rates. Increases in permeate flux rate have been observed to be approximately linear with increased shear rate in some systems. This means that the filtration medium area required can be dramatically reduced over other filtration means. Since shear can be delivered uniformly across the system, uniformly high flux rates can be achieved and maintained across the system such that progressive fouling is eliminated and extended filtration times can be realized. Moreover, high concentrations of agglomerated particulates can be achieved for removal from the treated fluid using dynamic filtration.

A dynamic filtration assembly has the ability to handle a wide range of contaminants, to achieve an appreciably high concentration of retained solids, to be operated continuously over extended periods without the need for filter aids and/or backflushing, and to achieve uniformly high filter performance to minimize the overall system size. The dynamic filtration assembly can be of any suitable configuration and typically will include a housing which contains a filter unit comprising one or more filtration media and a means to effect relative movement between the filtration medium and the fluid being treated. The filtration media of the filter unit and the means to effect relative movement between the fluid being filtered and the filtration medium can have any of a variety of suitable configurations. A variety of suitable motive means can be utilized to carry out such relative motion, such as, for example, rotational, oscillation, reciprocating, or vibratory means.

The dynamic filtration assembly can be of any suitable device. Suitable cylindrical dynamic filtration systems are described in U.S. Pat. Nos. 3,797,662, 4,066,554, 4,093,552, 4,427,552, 4,900,440, and 4,956,102. Suitable rotating disc dynamic filtration systems are described in U.S. Pat. Nos. 3,997,447 and 5,037,562, as well as in PCT published patent applications WO 95/00231 and WO 96/01676. Suitable oscillating, reciprocating, or vibratory dynamic filtration assemblies generally are described in U.S. Pat. Nos. 4,872, 988, 4,952,317, and 5,014,564. Other dynamic filtration devices are discussed in Murkes, "Fundamentals of Crossflow Filtration," Separation and Purification Methods, 19(1), 1–29 (1990). In addition, many dynamic filtration assemblies are commercially available. For example, suitable dynamic filtration assemblies include Pall BDF-LAB, ASEA Brown Bovery rotary CROT filter, and New Logic V-SEP.

The dynamic filtration desirably creates shear forces of at least about 20,000 sec$^{-1}$, preferably of at least about 100,000 sec$^{-1}$. Optimal filtration rates will be achieved at high shear rates, and, since shear-damage to the concentrate is not a concern in the context of the present invention, maximum shear is preferred, within practical equipment limitations.

Any suitable filtration medium can be utilized in the dynamic filtration assembly. Generally, the filtration medium will be a membrane, especially a polymeric membrane, such as described in U.S. Pat. No. 4,340,479.

If proteins are to be recovered from the milk product, it is desirable that the milk product not be heated to a temperature which could adversely affect the proteins therein (e.g., denature the proteins, particularly the immunoglobulins, therein). Accordingly, the milk product is desirably not subjected to high temperatures which could damage the proteins therein. In particular, the milk product is desirably maintained at a temperature of about 60° C. or less, preferably at a temperature of about 50° C. or less, more preferably at a temperature of about 40° C. or less, and most preferably at about 20–25° C. or below. Thus, the milk product is preferably not pasteurized nor derived from a pasteurized milk product (which involves raising the milk product to a high temperature to kill bacteria therein). Preferably, the milk product, such as raw skim milk or whey, is obtained as a product from milk which has been subjected to filtration, particularly dynamic filtration such as disclosed in U.S. Pat. Nos. 5,256,437, 5,356,651, and 5,401,523 to remove bacteria therefrom.

The present invention further provides a method of treating a milk product, particularly the bacteria-depleted and fat-depleted milk product permeate described above (most particularly such a raw skim milk or whey-derived permeate), to concentrate a protein therein by dynamically filtering the milk product through a filtration medium to form a protein-enriched retentate or a protein-enriched permeate (depending on the size of the protein relative to the pore rating of the filtration medium). Typically, the whey product will contain many proteins of different molecular weights, particularly immunoglobulins, lactoferrin, lactoperoxidase, blood serum albumin, β-lactoglobulin, and/or α-lactalbumin. The milk product typically will contain these same proteins, as well as casein. The present invention allows for the concentration of a particular protein or combination of proteins by the selection of particular dynamic filtration processing conditions, such as the pore rating of the filtration medium, and the use of a series of dynamic filtration steps using different dynamic filtration processing conditions, e.g., filtration media having increasingly smaller pore ratings.

The present invention provides for the removal of casein from a bacteria-depleted and fat-depleted milk product (particularly a raw skim milk-derived product) comprising dynamically filtering the milk product through a filtration medium to form a casein-enriched retentate and a casein-depleted permeate. The filtration medium can have any suitable pore rating, preferably a pore rating such that the casein is retained by the filtration medium while other, smaller molecular weight proteins (such as immunoglobulins and the like) pass through the filtration medium. The filtration medium preferably has a pore rating of about 0.05–0.2 μm, more preferably a pore rating of about 0.05–0.1 μm, and most preferably about 0.07–0.09 μm (particularly about 0.08 μm).

With respect to bacteria-, fat-, and casein-depleted milk products (such as raw skim milk and whey products treated in accordance with the aforedescribed methods), the present invention also provides a method of concentrating a first protein in a milk product comprising dynamically filtering the milk product through a first filtration medium to form a first protein-enriched retentate (i.e., the smaller molecular weight components pass through the filtration medium, while the protein of interest is retained by the filtration medium) or a first protein-enriched permeate (i.e., the protein of interest passes through the filtration medium, which removes larger molecular weight components), preferably such that the dynamic filtration results in the formation of a first protein-depleted retentate and a first protein-enriched permeate. The method further can comprise dynamically filtering the first protein-enriched permeate through a second filtration medium to form a first protein-enriched retentate (e.g., a retentate which excludes components of lower molecular weight than the first protein) and a first protein-depleted permeate (e.g., a permeate which includes the lower molecular weight components). If the first protein-depleted permeate comprises a second protein of lower molecular weight than the molecular weight of the first protein, then the method further can comprise dynamically filtering the first protein-depleted permeate through a third filtration medium to form a second protein-enriched retentate and a second protein-depleted permeate. Similarly, if the second protein-depleted permeate comprises a third protein of lower molecular weight than the molecular weight of the second protein, then the method further can comprise dynamically filtering the second protein-depleted permeate through a fourth filtration medium to form a third protein-enriched retentate and a third protein-depleted permeate. If the third protein-depleted permeate comprises a fourth protein of lower molecular weight than the molecular weight of the third protein, then the method further can comprise dynamically filtering the third protein-depleted permeate through a fifth filtration medium to form a fourth protein-enriched retentate and a fourth protein-depleted permeate. If the fourth protein-depleted permeate comprises a fifth protein of lower molecular weight than the molecular weight of the fourth protein, then the method further can comprise dynamically filtering the fourth protein-depleted permeate through a sixth filtration medium to form a fifth protein-enriched retentate and a fifth protein-depleted permeate. Such a process can be continued for further proteins or components of interest.

The pore ratings of the various filtration media preferably are such that a particular protein or combination of proteins is selectively removed from the milk product being dynamically filtered. In other words, the filtration medium preferably has a pore rating sufficient to remove a particular protein or combination of proteins, while allowing a different protein or combination of proteins to pass through the filtration medium.

In the aforedescribed protein concentration method, the first, second, third, fourth, and fifth (as well as any other) proteins can be any suitable proteins. Desirably, proteins of higher molecular weight (MW) are concentrated before proteins of lower molecular weight. Typically, the proteins will be selected from the group consisting of immunoglobulins, lactoferrin, lactoperoxidase, blood serum albumin (usually bovine serum albumin when the ultimate source of the milk product is bovine milk), β-lactoglobulin, and α-lactalbumin. When the milk product contains all of these proteins, then, typically, the first protein will be immunoglobulins (generally about 150–900 K Dalton MW); the second protein will be lactoferrin (generally about 74–90 K Dalton MW) and lactoperoxidase (generally about 77.5 K Dalton MW); the third protein will be blood serum albumin (generally about 66 K Dalton MW); the fourth protein will be 0-lactoglobulin (generally present in dimeric form of about 36 K Dalton MW, and the fifth protein will be α-lactalbumin (generally about 14 K Dalton MW). The present inventive process, of course, is applicable to other proteins, of larger or smaller molecular weight. Similarly, the present inventive process can be used to remove combinations of proteins based on the molecular weights of the proteins relative to the pore rating of the filtration medium being utilized in the dynamic filtration process. For example, instead of separately removing blood serum albumin and β-lactoglobulin from a milk product, these proteins can be rejected together by using a filtration medium having a pore rating sufficient to reject the lower molecular weight component β-lactoglobulin. Other combinations of proteins can be rejected in a similar manner.

If the initial milk product is conventional raw skim milk or whey, then, after the aforesaid proteins are rejected from the milk product, the resulting permeate will be fat- and protein-depleted and should contain only minerals, vitamins, and lactose. The removal and concentration of the various proteins can be accomplished in accordance with the present invention by, for example, dynamically filtering a milk product through one or more filtration media having suitable pore ratings so as to form a bacteria-, fat-, and casein-depleted milk product permeate, and then subjecting the milk product permeate to the aforedescribed sequential dynamic filtration steps wherein (a) the first filtration medium has a molecular weight cutoff of about 900,000 Dalton or more, preferably about 900,000–1,000,000 Dalton, to reject any residual fat and casein and to concentrate the proteins of interest in the permeate (although this step preferably is omitted in some embodiments of the present invention), (b) the second filtration medium has a molecular weight cutoff of about 90,000 Dalton or more, preferably about 90,000–100,000 Dalton, to form an immunoglobulin-enriched retentate, (c) the third filtration medium has a molecular weight cutoff of about 60,000–70,000 Dalton, preferably about 60,000–65,000 Dalton, to form a lactoferrin/lactoperoxidase-enriched retentate, (d) the fourth filtration medium has a molecular weight cutoff of about 40,000–60,000 Dalton, preferably about 50,000–60,000 Dalton, to form a blood serum albumin-enriched retentate, (e) the fifth filtration medium has a molecular weight cutoff of about 15,000–25,000 Dalton, preferably about 15,000–20,000 Dalton, to form a β-lactoglobulin-enriched retentate and a α-lactalbumin-enriched permeate, and/or (e) the sixth filtration medium has a pore rating of about 10,000 Dalton or less, preferably about 5,000–10,000 Dalton, to form β-lactalbumin-enriched retentate and a substantially protein-depleted permeate containing smaller molecular weight components, such as peptides, minerals, vitamins, and lactose.

The dynamic filtration processing conditions, e.g., the shear rate, can alter the transmission through the filtration medium, i.e., the effective pore rating of the filtration medium, such that a filtration medium, having a particular molecular weight cutoff rating under relatively high shear conditions can exclude proteins of higher molecular weight, i.e., have a higher effective pore rating. Such an effect can be compensated for by using a filtration medium having a lower pore rating (e.g., lower nominal molecular weight cutoff) so as to result in the effective use, under the particular dynamic filtration conditions, of a filtration medium having the desired pore rating.

In addition, while each particular protein or collection of proteins can be recovered or concentrated by passage through a single filtration medium as described above, it may be desirable to use two or more filtration media (i.e., to use multiple sequential dynamic filtration steps) to recover or concentrate each particular protein. Thus, for example, a milk product containing a particular protein can be dynamically filtered using a first filtration medium having a pore rating or molecular weight cutoff somewhat in excess of the size or molecular weight of the particular protein to reject a significant portion of the much larger molecular weight components that are not of interest, and then the resulting permeate can be dynamically filtered using a second filtration medium having a pore rating or molecular weight cutoff closer to the size or molecular weight of the particular protein to remove substantially the remainder of the undesired components having a molecular weight larger than that of the particular protein.

The following examples further illustrate the present invention and, of course, should not be construed as in any way limiting its scope.

EXAMPLE 1

This example illustrates the present inventive method for treating milk to reduce the fat and recover the proteins therein.

Whole milk is subjected to centrifugal separation or dynamic filtration (using a filtration medium having a pore rating of 0.8 μm) to produce a cream retentate and a skim milk permeate. The skim milk permeate is dynamically filtered (using a filtration medium having a pore rating of 0.4 μm) to produce a fat-enriched retentate and a fat/bacteria-depleted permeate. The fat/bacteria-depleted permeate is dynamically filtered (using a filtration medium having a pore rating of 0.05–0.2 μm) to produce a micellar casein-enriched retentate (having a 15–20% total solids concentration, with a 60–70% micellar casein concentration of the total solids) and a milk serum permeate.

The milk serum permeate is dynamically filtered (using a filtration medium having a molecular weight cutoff of 100,000 Dalton) to produce an immunoglobulin-enriched retentate and an i oglobulin-depleted milk serum permeate. The immunoglobulin-depleted milk serum permeate is dynamically filtered (using a filtration medium having a molecular weight cutoff of 70,000 Dalton) to produce a lactoferrin/lactoperoxidase-enriched retentate and a lactoferrin/lactoperoxidase-depleted milk serum permeate. The lactoferrin/lactoperoxidase-depleted milk serum permeate is dynamically filtered (using a filtration medium having a molecular weight cutoff of 50,000 Dalton) to produce a bovine serum albumin-enriched retentate and an immunoglobulin/lactoferrin/lactoperoxidase/bovine serum albumin-depleted permeate. Alternatively, the milk serum permeate could be dynamically filtered (using a filtration medium having a molecular weight cutoff of 50,000 Dalton) to directly produce an The immunoglobulin/lactoferrin/lactoperoxidase/bovine serum albumin-depleted permeate.

The immmoglobulin/lactoferrin/lactoperoxidase/bovine serum albumin-depleted permeate is dynamically filtered (using a filtration medium having a molecular weight cutoff of 20,000 Dalton) to produce a β-lactoglobulin-enriched retentate and a β-lactoglobulin-depleted permeate. The β-lactoglobulin-depleted permeate is dynamically filtered (using a filtration medium having a molecular weight cutoff of 10,000 Dalton) to produce an α-lactalbumin-enriched retentate and an α-lactalbumin-depleted permeate (containing non-fat, non-protein milk solids).

EXAMPLE 2

This example illustrates the present inventive method for treating whey to reduce the fat and recover the proteins therein.

Cheese whey is subjected to centrifugal separation or dynamic filtration (using a filtration medium having a pore rating of 0.65 μm) to produce a whey cream retentate and a fat-depleted whey permeate. The fat-depleted whey permeate is dynamically filtered (using a filtration medium having a pore rating of 0.4 μm) to produce a fat-enriched retentate and a fat/bacteria-depleted, protein-enriched permeate. The fat/bacteria-depleted, protein-enriched permeate is dynamically filtered (using a filtration medium having a pore rating of 0.2 μm) to produce fat/bacteria-enriched sludge retentate and a whey protein-enriched permeate.

The whey protein-enriched permeate is dynamically filtered (using a filtration medium having a molecular weight cutoff of 100,000 Dalton) to produce an irmunoglobulin-enriched retentate and an immunoglobulin-depleted whey product permeate. The immunoglobulin-depleted whey product permeate is dynamically filtered (using a filtration medium having a molecular weight cutoff of 70,000 Dalton) to produce a lactoferrin/lactoperoxidase-enriched retentate and a lactoferrin/lactoperoxidase-depleted whey product permeate. The lactoferrin/lactoperoxidase-depleted whey product permeate is dynamically filtered (using a filtration medium having a molecular weight cutoff of 50,000 Dalton) to produce a bovine serum albumin-enriched retentate and an immunoglobulin/lactoferrin/lactoperoxidase/bovine serum albumin-depleted permeate. The immunozlobulin/lactoferrin/lactoperoxidase/bovine serum albumin-depleted permeate is dynamically filtered (using a filtration medium having a molecular weight cutoff of 20,000 Dalton) to produce β-lactoglobulin-enriched retentate and a β-lactoglobulin-depleted permeate. The β-lactoglobulin-depleted permeate is dynamically filtered (using a filtration medium having a molecular weight cutoff of 10,000 Dalton) to produce an α-lactalbumin-enriched retentate and an α-lactalbumin-depleted permeate (containing non-fat, non-protein whey solids).

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A method of concentrating a first protein in a bacteria-, fat-, and casein-depleted milk product comprising dynamically filtering said milk product through a first filtration medium to form a first protein-enriched permeate, and dynamically filtering said first protein-enriched permeate through a second filtration medium to form a first protein-enriched retentate and a first protein-depleted permeate.

2. The method of claim 1, wherein said first protein-depleted permeate comprises a second protein of lower molecular weight than the molecular weight of said first protein, and said method further comprises dynamically filtering said first protein-depleted permeate through a third filtration medium to form a second protein-enriched retentate and a second protein-depleted permeate.

3. The method of claim 2, wherein said second protein-depleted permeate comprises a third protein of lower molecular weight than the molecular weight of said second protein, and said method further comprises dynamically filtering said second protein-depleted permeate through a fourth filtration medium to form a third protein-enriched retentate and a third protein-depleted permeate.

4. The method of claim 3, wherein said third protein-depleted permeate comprises a fourth protein of lower molecular weight than the molecular weight of said third protein, and said method further comprises dynamically filtering said third protein-depleted permeate through a fifth filtration medium to form a fourth protein-enriched retentate and a fourth protein-depleted permeate.

5. The method of claim 4, wherein said fourth protein-depleted permeate comprises a fifth protein of lower molecular weight than the molecular weight of said fourth protein, and said method further comprises dynamically filtering said fourth protein-depleted permeate through a sixth filtration medium to form a fifth protein-enriched retentate and a fifth protein-depleted permeate.

6. The method of claim 1, wherein said first protein is selected from the group consisting of immunoglobulins, lactoferrin, lactoperoxidase, blood serum albumin, β-lactoglobulin, and α-lactalbumin.

7. The method of claim 2, wherein said first and second proteins are selected from the group consisting of immunoglobulins, lactoferrin, lactoperoxidase, blood serum albumin, β-lactoglobulin, and α-lactalbumin.

8. The method of claim 3, wherein said first, second, and third proteins are selected from the group consisting of immunoglobulins, lactoferrin, lactoperoxidase, blood serum albumin, β-lactoglobulin, and α-lactalbumin.

9. The method of claim 4, wherein said first, second, third, and fourth proteins are selected from the group consisting of immunoglobulins, lactoferrin, lactoperoxidase, blood serum albumin, β-lactoglobulin, and α-lactalbumin.

10. The method of claim 5, wherein said first, second, third, fourth, and fifth proteins are selected from the group consisting of immunoglobulins, lactoferrin, lactoperoxidase, blood serum albumin, β-lactoglobulin, and α-lactalbumin.

11. The method of claim 10, wherein said first filtration medium has a molecular weight cutoff of about 900,000 Dalton or more, said second filtration medium has a molecular weight cutoff of about 90,000 Dalton or more, said third filtration medium has a molecular weight cutoff of about 60,000–70,000 Dalton, said fourth filtration medium has a molecular weight cutoff of about 40,000–60,000 Dalton, said fifth filtration medium has a molecular weight cutoff of about 15,000–25,000 Dalton, and said sixth filtration medium has a pore rating of about 10,000 Dalton or less.

12. The method of claim 11, wherein said first filtration medium has a molecular weight cutoff of about 900,0000–1,000,000 Dalton, said second filtration medium has a molecular weight cutoff of about 90,000–100,000 Dalton, and said fifth filtration medium has a molecular weigh cutoff of about 5,000–10,000 Dalton.

13. The method of claim 9, wherein said first filtration medium has a molecular weight cutoff of about 90,000–100, 000 Dalton, said second filtration medium has a molecular weight cutoff of about 60,000–70,000 Dalton, said third filtration medium has a molecular weight cutoff of about 40,000–60,000 Dalton, said fourth filtration medium has a molecular weight cutoff of about 15,000–25,000 Dalton, and said fifth filtration medium has a molecular weight cutoff of about 5,000–10,000 Dalton.

14. The method of claim 1, wherein said milk product is obtained from milk which has not been subjected to a temperature in excess of 50° C.

15. The method of claim 14, wherein said milk product is obtained from milk which has not been subjected to a temperature in excess of 40° C.

* * * * *